United States Patent [19]
Krause et al.

[11] 3,886,710
[45] June 3, 1975

[54] TABLE CONSTRUCTION

[75] Inventors: Franz Krause, East Port; Austin T. Shulberg, Bright Waters, both of N.Y.

[73] Assignee: Classic Games Company, Inc., Deer Park, N.Y.

[22] Filed: June 26, 1973

[21] Appl. No.: 373,653

[52] U.S. Cl. ............................... 52/758 H; 403/170
[51] Int. Cl. ............................................. E04b 1/00
[58] Field of Search ........... 403/170, 171, 172, 174, 403/176, 178, 217, 205, 382, 403; 52/758 H, 52/656, 285, 475

[56] References Cited
UNITED STATES PATENTS

| | | |
|---|---|---|
| 3,545,625 | 12/1970 | MacMillan ...................... 403/176 X |
| 3,666,298 | 5/1972 | Reilly .................................. 403/172 |
| 3,726,551 | 4/1973 | Levenberg ......................... 403/172 |

FOREIGN PATENTS OR APPLICATIONS

| | | |
|---|---|---|
| 104,632 | 3/1917 | United Kingdom ................. 403/171 |
| 910,183 | 11/1962 | United Kingdom ................. 403/171 |

*Primary Examiner*—H. Hampton Hunter

[57] ABSTRACT

A table construction including four plastic connectors, four tubular table top rods and four tubular table leg rods. Each connector includes two table top connecting stubs and a table leg connecting stub. Each end of a tubular table top rod is connected to a table top connecting stub of two different connectors. A tubular table leg rod is connected to the table leg connecting stub of each connector. Means is provided for preventing the tubular table rod elements from moving relative to the connector to which they are attached. Means is provided for supporting a sheet of glass.

7 Claims, 7 Drawing Figures

PATENTED JUN 3 1975  3,886,710

SHEET 1

PATENTED JUN 3 1975
SHEET 2
3,886,710
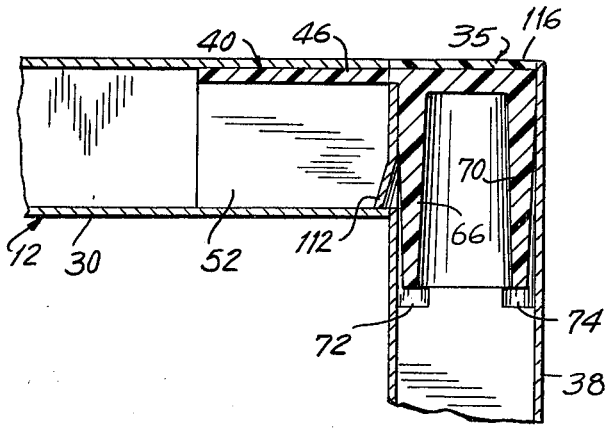
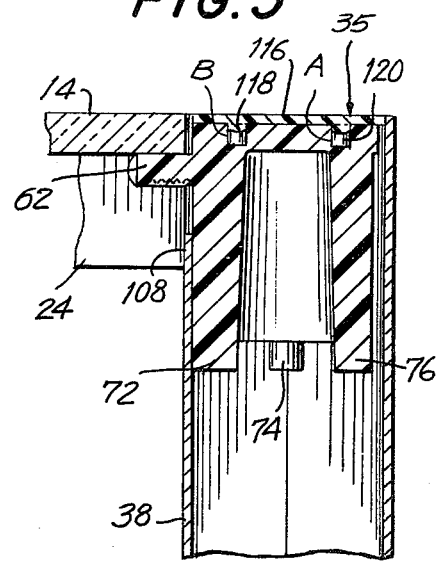
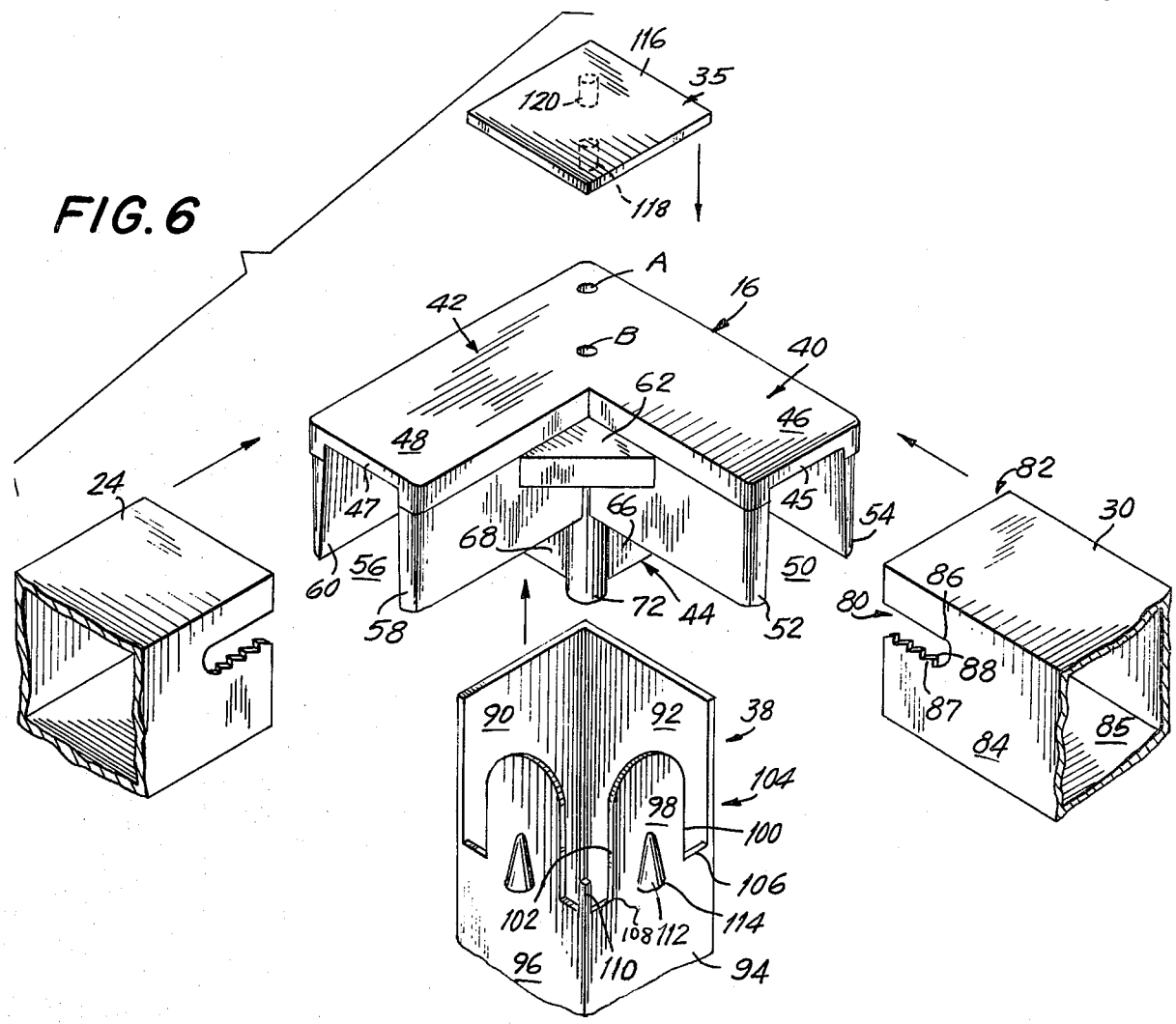

TABLE CONSTRUCTION

BACKGROUND OF THE INVENTION

1. Field of the Invention

Construction apparatus

2. Description of the Prior Art

In the past tables were constructed from tubular table top rods which were joined together to form a table top. In addition, tubular table leg rods extended downwardly from certain locations on the table top. Connecting means were provided for connecting the tubular table top rods together and for connecting the tubular table leg rods to the table top. Quite frequently, the table top was used to support a piece of transparent glass so that the final result was a table having a transparent glass top.

At one time welding was used for securing tubular table rods to each other in manufacturing the aforedescribed table. Additionally, screw connectors were used for this purpose. Welding obviously had the drawback of requiring specialized equipment and skilled personnel to operate the equipment.

A recent innovation has been the use of connectors which have stub projections that fit into the tubular table rods. Usually there were three stubs on each connector. After assembly two of the stubs were at right angles to each other and horizontal with the third stub extending downwardly from the first two stubs. There were certain drawbacks in the prior art connectors heretofore described. Most were formed as die castings which was expensive. Another drawback of utilizing die castings was that the die castings were not very accurate and as a result there were loose connections with the tubular table rods.

SUMMARY OF THE INVENTION

Purposes of the Invention

It is an object of the present invention to provide an improved construction apparatus.

Another object of the present invention is to provide an improved table construction.

Still a further object of the present invention is to provide improved apparatus for constructing tables which does not require the use of tools, adhesives or hardware.

Another object of the present invention is to provide a connector for use in constructing tables, shelves, bookcases, and similar items with said connector having a built-in ledge for supporting a flat rigid sheet of material.

Another object of the present invention is to provide a table construction formed from connectors and rigid tubular rods with said construction being aesthetically pleasing in that the connectors, except for their ledges, are not visible in the completed table construction.

Other objects of the invention in part will be obvious and in part will be pointed out hereinafter.

BRIEF DESCRIPTION OF THE INVENTION

According to the present invention, the foregoing as well as other objects are achieved by having a plastic connector which includes three stubs. The first and second stubs are horizontal when forming part of an upright completed table and are perpendicular to each other. The first and second stubs have an inverted channel-shaped cross section. The upper surfaces of the first and second stubs are in a common plane when the connector is in the position it assumes in a completed upright table. A gusset extends between said first and second stubs slightly below said common plane.

The third stub extends perpendicularly away from the intersection of said first and second stubs and in a downward direction when the connector is in a completed table. The third stub has four identical outside spaced apart flat surfaces. The four flat surfaces, if extended, would form a square and a rounded projection is located in the space between each pair of adjacent flat surfaces.

In a fully constructed table four identical connectors are utilized.

Four tubular table top rods are used which are identical except for length. Each tubular table top rod has two ends and includes a slot at each end thereof.

Four identical tubular table leg rods are used. The first end of each of the tubular table leg rods is flat and normally is located on a supporting surface, such as a floor. Located at the second end on two sides of each tubular table leg rod is an inverted U-shaped tab. A boss extends outwardly from the base of each inverted U-shaped tab.

A first tubular table leg rod is positioned so the upper end thereof encircles the third stub of a first connector and so that one tab is received within the channel of the first stub thereof and the second tab received within the channel of the second stub thereof. One end of a first tubular table top rod is positioned to encircle the first stub of the first connector with the gusset of the first connector received in the slot at said one end. One end of a second tubular table top rod is positioned to encircle the second stub of the first connector and so that the gusset of the first connector is received in the slot at the one end of the second tubular table top rod. The lower side of the first and second tubular table top rods are located slightly under each respective boss of the first tubular leg rod so as to prevent the first tubular table leg rod from being easily pulled from the connector.

The table is constructed in this manner using all the remaining pieces. A sheet of glass can be supported by the four gussets.

The invention accordingly consists in the features of construction, combination of elements, and arrangement of parts which will be exemplified in the table construction hereinafter described and of which the scope of application will be indicated in the appended claims.

BRIEF DESCRIPTION OF THE DRAWINGS

In the drawings:

FIG. 4 is a sectional view taken substantially along the line 4—4 of FIG. 2;

FIG. 5 is a sectional view taken substantially along the line 5—5 of FIG. 2;

FIG. 6 is an exploded view showing a table connector, segments of two tubular table top rods, a segment of a tubular table leg rod and a corner plate.

DESCRIPTION OF THE PREFERRED EMBODIMENT

Figure 1:
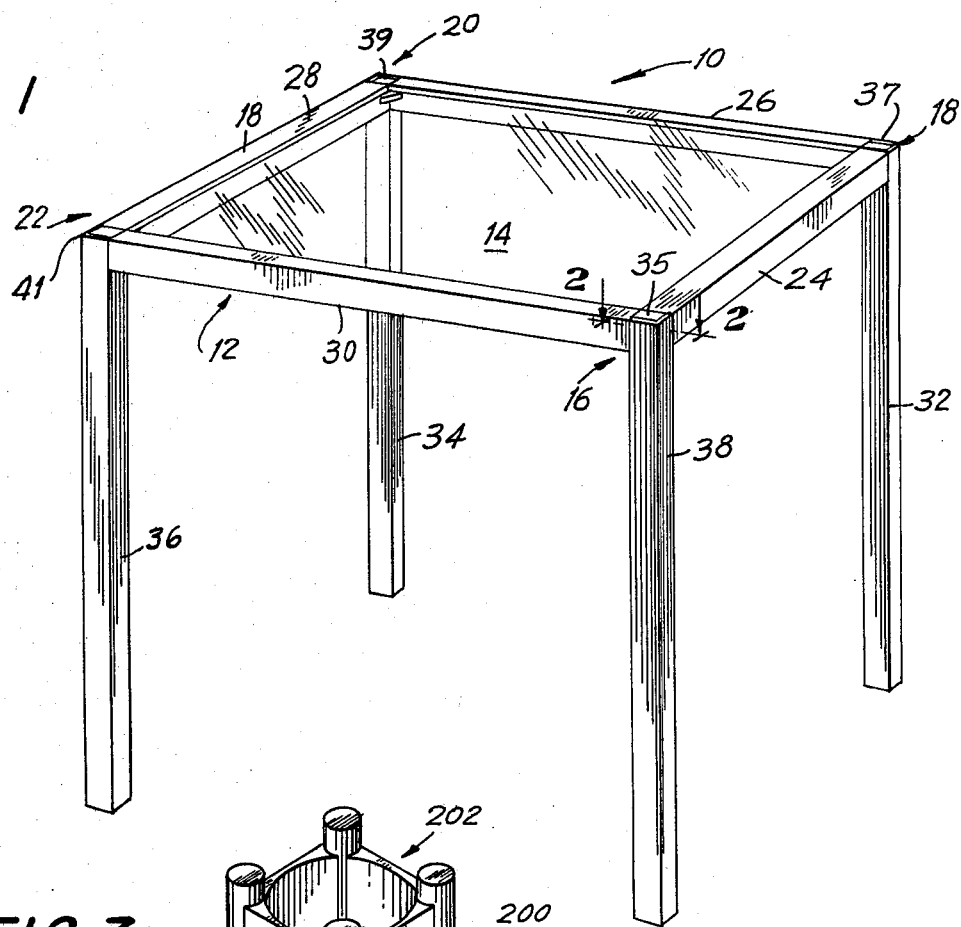
FIG. 1 is a perspective view of a table constructed according to the present invention.

In the drawings a table construction 10 according to the present invention is shown and includes a frame 12 and a glass top 14. Frame 12 is formed from four identical connectors which are identified by reference numerals 16, 18, 20 and 22, by four tubular table top rods which are identified by reference numerals 24, 26, 28 and 30 and are identical except possibly for length and by four identical tubular table leg rods identified by reference numerals 32, 34, 36 and 38. In addition, four identical plastic corner plates 35, 37, 39 and 41 are utilized.

Each connector secures the ends of two adjacent tubular table top rods and the upper end of one tubular table leg rod.

In FIGS. 2 through 6 connector 16 is illustrated and shown to include a first stub 40, a second stub 42 and a third stub 44. First stub 40 is perpendicular to second stub 42 and to third stub 44 which extends perpendicularly away from the intersection of first stub 40 and second stub 42. First stub 40 includes a top wall 45 having top flat surface 46. Stub 42 includes top wall 47 having top flat surface 48 which is coplanar with top flat surface 46. First stub 40 includes a channel-shaped interior 50 defined by parallel opposed walls 52 and 54 and top wall 45. Walls 52 and 56 may each include a draft. In a similar fashion, second stub 42 includes a hollow channel-shaped interior 56 which is defined by parallel opposed walls 58 and 60 and top wall 47. Walls 58 and 60 may each include a draft. Walls 54 and 60 intersect as do walls 52 and 58.

A triangularly-shaped gusset 62, parallel to a plane passing through top flat surfaces 46 and 48, extends between walls 52 and 58 and one side of said gusset contacts wall 58 while the other side of said gusset contacts wall 52 with the intersection between said two sides contacting the intersection of walls 52 and 58.

Third stub 44 includes walls 64, 66, 68 and 70. Wall 66 extends to top wall 45 while wall 68 extends to top wall 47. Each of the third stub walls includes an outside surface. The outside surfaces of walls 64 and 68 are parallel and in registry with each other and perpendicular to the outside surfaces of walls 66 and 70. In a similar fashion, the outside surfaces of walls 66 and 70 are parallel and in registry with each other and perpendicular to the outside surfaces of walls 64 and 68. The configurations of the outside surfaces of walls 64, 66, 68 and 70 are identical.

A rounded upright projection 72 extends between adjacent portions of the outside surfaces of walls 66 and 68. Identical rounded projections 74, 76 and 78 are provided between the remaining adjacent outside surfaces of the walls of third stub 44. Each projection extends slightly past its adjacent sides with the bottom of each projection being rounded.

Two blind holes A and B extend into the top of connector 16 at the intersection between top flat surface 46 and top flat surface 48.

The connectors used in the present invention are made from a suitable plastic such as polyethylene. Of course, other materials may be used.

Tubular table top rod 30 is square, has four sides and includes two identical ends with said ends being perpendicular to the elongated axis of said tubular table top rod. A slot 80 extends inwardly along side 84 from end 82 of tubular table top rod 30. Slot 80 includes an upper edge 86 and a lower edge 87 with teeth 88 formed on lower edge 87. Said teeth point away from end 82 for a reason that will soon be apparent. The cross section of tubular table top rod 30 is square.

Tubular table leg rod 38 includes two ends with the lower end (not shown in FIG. 6) being flat and perpendicular to the elongated axis of said tubular table leg rod. Tubular table leg rod 38 includes four sides 90, 92, 94 and 96 which at the mid-portion of said tubular table leg rod enclose a square area. As can be seen in FIG. 6, perpendicular sides 90 and 92 are uninterrupted for the full height of tubular leg rod 38 as well as being adjacent each other. Perpendicular sides 94 and 96 are interrupted at their uppermost portion as will hereinafter be described.

Side 94 at its upper segment includes an inverted U-shaped tab 98, the upper portion of said tab being below a plane passing through the upper edges of sides 90 and 92 by the thickness of top wall 45. U-shaped tab 98 includes edges 100 and 102 which are parallel to each other. Edge 100 is parallel to side 92 and spaced therefrom so that a slot 104 is formed between said edge and said side. An edge 106 is located at the bottom of slot 104 and extends between the bottom of edge 100 and side 92. An edge 108 extends away from the bottom of edge 102 and is in alignment with edge 106. Extending upwardly from the portion of edge 108 furthest from edge 102 is a rectangular projection 110 which is coplanar with side 94 and side 96. Rectangular projection 110 does not extend to the upper portion of sides 90 and 92.

Extending outwardly from the bottom of tab 98 is a boss 112. Boss 112 extends outwardly from tab 98 by increasing amounts in a downward direction and located at the bottom of said boss is an arcuate edge 114. Edge 114 is elevated above edges 106 and 108 when tubular table leg rod 38 is held in an upright position. The tab structure of side 96 is identical to the tab structure on side 94.

All of the tubular table top rods and all of the tubular table leg rods are made from aluminum or an aluminum alloy and are extruded. The tabs at the upper ends of the tubular table leg rods are formed by die-cutting in a preferred aspect of the present invention. Of course, other cutting techniques can be used.

If desired, the tubular table top rods and tubular table leg rods can be constructed from other metals or from a suitable plastic. Still further, the tubular table rods can have round or multi-faceted cross sections and need not be square as shown in the drawings.

Corner plate 35 has a square cross section and parallel flat opposed surfaces. Extending downwardly from the bottom of plate 35 are nipples 118 and 120 which cooperate with holes A and B in connector 16 as will hereinafter be described.

In assembling a table construction according to the present invention connector 16 is held and tubular table leg rod 38 is moved so that the upper end of said rod surrounds stub 44. A negative clearance exists between projections 72, 74, 76 and 78 and the interior of the upper portion of tubular table leg rod 38 so that a tight fit exists. The projections facilitate the placing of tubular table leg rod 38 about stub 44. Tab 98 is received within channel 50 and abuts the bottom surface of wall 45. Edge 102 abuts the inside surface of wall 52 and edge 100 abuts the inside surface of wall 54. Side 92 of tubular table leg rod 38 contacts the outside surface of wall 64 and in a similar fashion side 90 contacts the outside surface of wall 70. Rectangular projection 110 is located below gusset 62. The tab on side 96 is received in channel 56 in the same manner that tab 98 is received in channel 50.

It should be noted that in moving tubular table leg rod 38 along stub 44 that some shearing or shaving of portions of the projections on stub 44 may occur so that there will be conformity between the interior of tubular table leg rod 38 and the outside area of stub 44. The tight fit of tubular table leg rod 38 about stub 44 ensures a firm connection therebetween.

Tubular table top rod 30 is moved along stub 40 and gusset 62 is received in slot 80. The abutment of side 85 of tubular table rod 30 with side 94 of tubular table leg rod 38 limits the foregoing movement of tubular table top rod 30. Teeth 88 firmly grip the under surface of gusset 62 to prevent tubular table top rod 30 from being pulled away from connector 16. The reason teeth 88 prevent tubular table top rod 30 from being pulled away from connector 16 is that said teeth point away from end 82 and firmly grip the ledge to prevent said table top rod from being pulled therefrom. A negative clearance exists between the enclosed area of tubular table top rod 30 and walls 45, 52 and 54 of stub 40 so that a tight fit is formed. It should be noted that when tubular table top rod 30 is moved along stub 40 that the dimension between walls 52 and 54 slightly decreases with said wall bearing against the opposed vertical sides of said tubular table top rod which assists in securing said tubular table top rod to connector 16. In a similar fashion, tubular table top rod 24 is secured to stub 42 of connector 16. A square space exists along surfaces 46 and 48 inasmuch as tubular table top rods 30 and 24 do not extend completely over flat surfaces 46 and 48.

Plate 35 is positioned so that nipples 118 and 120 are received in blind holes A and B and fill the rectangular space left on flat surfaces 46 and 48. Plate 35 has the same thickness as the upper side of tubular table top rods 30 and 24 and one edge of said plate abuts an edge of the upper side of tubular table top rod 30 and a second edge of said plate abuts an edge of the upper side of tubular table top rod 24.

The remaining three connectors are used to secure the remaining tubular table top rods, the remaining end of tubular table top rods 24 and 30 and the remaining tubular table leg rods in the fashion just described. In addition, the remaining plates are used to fill the corners on the remaining connectors.

When this has been accomplished, a sheet of glass can be supported on the gussets of each table connector. The glass is preferably chosen so that the upper surface of said sheet of glass is flush with the top side of each of the tubular table top rods and the four plates.

Certain features of the invention merit special discussion. By having a boss on each of the tabs of each tubular table leg rod the connection between said rod and the connector to which it is attached is strengthened. As an example, attention is directed to FIG. 6. In the completed table construction the lower side of tubular table top rod 30 is received under boss 112 and in the same fashion one side of tubular table top rod 24 is received under the boss on side 96. Thus a downward force exerted on tubular table leg rod 38 does not result in separation of said rod from connector 16 as the abutment by the boss on side 94 with the lower side of tubular table top rod 30 and the abutment of the boss on the tab of side 96 of tubular leg rod 38 with the lower side of tubular table top rod 24 prevents said tubular table leg rod 38 from being removed from connector 16.

It should be noted that the construction of a table according to the present invention can be done without the use of adhesives, weldments, mitres, screws, nuts, expanders or any special hardware and tools.

Still further, the structure of the present invention can be shipped in a knocked-down form so as to occupy a minimum volume.

By having ledge 62 an integral part of the connector, the support of a table top is easily accomplished without the need for additional supporting hardware.

In the finished construction no part of any connector, other than the ledge of a connector, is visible to the eye. This enhances the aesthetic appearance of the constructed table and successfully mimes the appearance of more expensive and complicated methods of joining tubing, to wit, welding and mitring.

Figure 7:
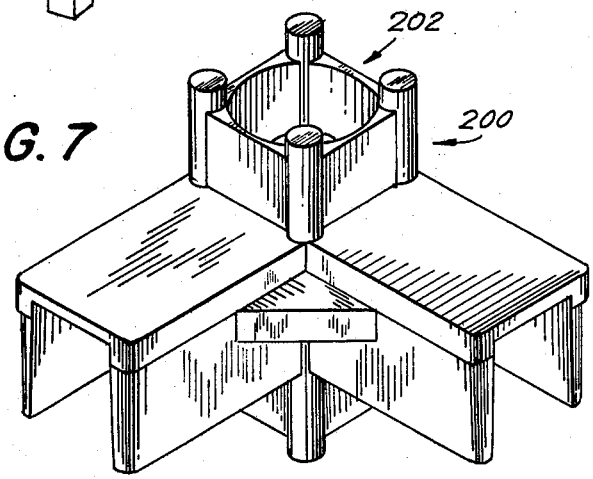
FIG. 7 is a perspective view of a modified connector according to the present invention.
Figure 2:
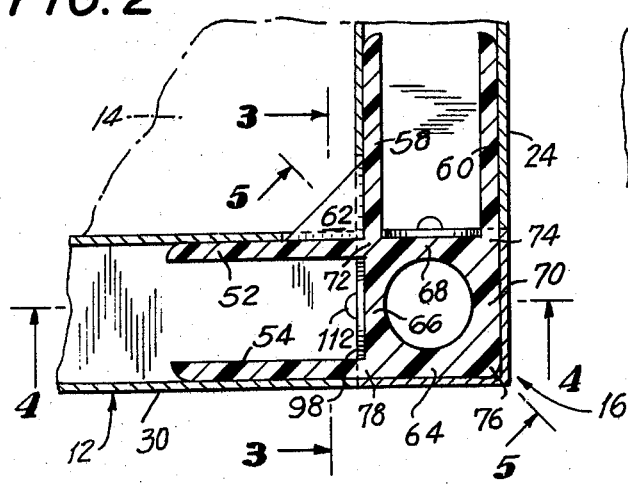
FIG. 2 is an enlarged sectional view taken substantially along the line 2—2 of FIG. 1.
Figure 3:
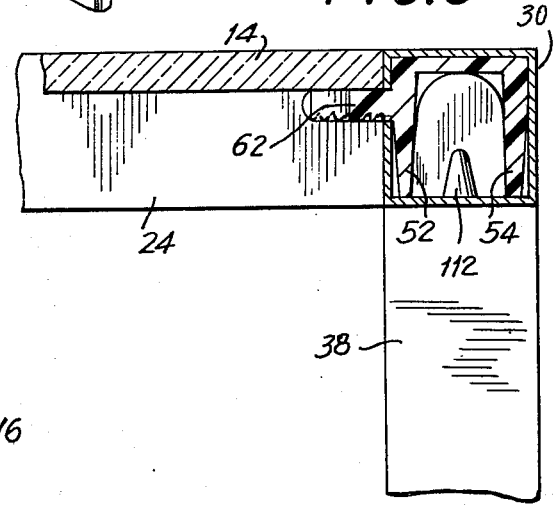
FIG. 3 is a sectional view taken substantially along the line 3—3 of FIG. 2.

In FIG. 7 of the drawings a modified form of a connector 200 is shown and is identical to connector 16 except as hereinafter described. Connector 200 includes an upright stub 202 identical to stub 44 with stub 202 extending upwardly from flat surfaces 46 and 48. The purpose of stub 202 is to enable tubular rods to be connected thereto so that said connector can be used in the construction of a stacked structure.

It is to be appreciated that the principles of the present invention, i.e. the use of a specially designed connector and special tubular rods can be used in the construction of toys, book shelves, bookcases and other items.

If desired, a checker board pattern can be placed on sheet of glass 14 so the table construction can be used for playing chess or checkers.

As various possible embodiments might be made of the above invention, and as various changes might be made in the embodiment above set forth, it is to be understood that all matter herein described or shown in the accompanying drawings is to be interpreted as illustrative and not in a limiting sense.

Having thus described the invention there is claimed as new and desired to be secured by Letters Patent:

1. Apparatus comprising a one-piece plastic connector, said connector including a first stub, a second stub and a third stub, said first stub intersecting with said second stub and being perpendicular to said second stub, said third stub extending away from the intersection of said first and second stubs, means extending between said first and second stubs for supporting a plate of material and for use in securing tubular rods to said first and second stubs, a first tubular rod, said first tubular rod having an elongated axis and a first end and a second end, a slot located at said first end of said first tubular rod, said first end of said first tubular rod tightly surrounding said first stub with said extending means partially received in said slot.

2. Apparatus according to claim 1 wherein said first tubular rod includes teeth at said slot which grip said extending means.

3. Apparatus according to claim 2 wherein said first tubular rod includes a second end identical to said first end.

4. Apparatus according to claim 1 wherein said first tubular rod has a square cross section and is made from a metal material.

5. Apparatus according to claim 1 further including a second tubular rod, said second tubular rod including four sides, said third stub including four sides, said second tubular rod having a first end, said first end of said second tubular rod tightly surrounding said third stub, and means associated with said second tubular rod for cooperating with said first tubular rod to prevent removal of said second tubular rod from said connector unless said first tubular rod is first removed from said connector.

6. Apparatus according to claim 4 further including a second tubular rod, said second tubular rod including four sides, said third stub including four sides, said second tubular rod including a first end, said first end of said second tubular rod tightly surrounding said third stub, said first stub including a first side wall and a second side wall, said first and second side walls being spaced from each other, said first stub including a top wall spanning said first and second side walls, an inverted U-shaped tab located at the first end of said second tubular rod, said tab including opposed first and second edges, said tab first edge abutting said first stub first side wall and said tab second edge abutting said first stub second side wall.

7. Apparatus according to claim 5 wherein said associating means includes a boss located at said first end of said second tubular rod, a portion of the first end of said first tubular rod extending beneath said boss.

* * * * *